US012809185B2

(12) United States Patent
Chen

(10) Patent No.: US 12,809,185 B2
(45) Date of Patent: Nov. 24, 2026

(54) HIGH VIEWING ANGLE MAGNIFYING DEVICE

(71) Applicant: Far Vision Technology Co., Ltd., Taichung City (TW)

(72) Inventor: Stephen Chen, Taichung City (TW)

(73) Assignee: FAR VISION TECHNOLOGY CO., LTD., Taichung City (TW)

( * ) Notice: Subject to any disclaimer, the term of this patent is extended or adjusted under 35 U.S.C. 154(b) by 248 days.

(21) Appl. No.: 18/823,208

(22) Filed: Sep. 3, 2024

(65) Prior Publication Data

US 2025/0277985 A1 Sep. 4, 2025

(30) Foreign Application Priority Data

Mar. 4, 2024 (TW) ................................ 113202162

(51) Int. Cl.

| | |
|---|---|
| ***G02B 5/08*** | (2006.01) |
| ***G02B 7/182*** | (2021.01) |
| ***G02B 17/06*** | (2006.01) |
| ***G02B 27/02*** | (2006.01) |
| ***G02B 27/04*** | (2006.01) |

(52) U.S. Cl.
CPC ........... *G02B 27/04* (2013.01); *G02B 7/1821* (2013.01); *G02B 17/0694* (2013.01); *G02B 27/028* (2013.01)

(58) Field of Classification Search
CPC .. G02B 27/04; G02B 7/1821; G02B 17/0694; G02B 27/028
See application file for complete search history.

(56) References Cited

U.S. PATENT DOCUMENTS

2019/0369382 A1* 12/2019 Chen ...................... G02B 27/04
2025/0220142 A1* 7/2025 Chen .................... H04N 9/3141

* cited by examiner

*Primary Examiner* — Euncha P Cherry
(74) *Attorney, Agent, or Firm* — MUNCY, GEISSLER, OLDS & LOWE, P.C.

(57) ABSTRACT

A high viewing angle magnifying device for desktop use obtains magnified images of distant objects. It comprises a bracket assembly and a mirror frame assembly. The mirror frame assembly, which mounts on the bracket assembly, includes a reflective mirror frame, a rotation shaft, and a magnifying mirror frame, and provides an optical path for image magnification. The reflective mirror frame is mounted on the bracket assembly and has an elevated, inclined reflective mirror. The magnifying mirror frame, attached to the rotation shaft, is rotatable relative to the reflective mirror frame and contains a magnifying mirror above the object. The optical path is configured to direct a light projecting from the object to the magnifying mirror, then the light of the object reflected from the magnifying mirror and projects to reflective mirror, and finally reflected and projects outwardly form the reflective mirror.

14 Claims, 10 Drawing Sheets

HIGH VIEWING ANGLE MAGNIFYING DEVICE

FIELD OF INVENTION

The present disclosure relates to an optical device, in particular a high viewing angle magnifying device, capable of magnifying the image of an object.

BACKGROUND OF THE INVENTION

Existing reading magnifiers use lens magnification principles to enlarge and display books or mobile phones, allowing users with poor vision to view them easily.

For example, Chinese Patent Publication No. CN209731365U discloses a mobile phone magnifier, which comprises a rectangular base plate, a support plate placed vertically on the distance of the base plate, and a magnifying glass placed vertically on the near side of the base plate in parallel with and spaced from the support plate. The user can place the back of the mobile phone against the support plate and view the magnified screen through the magnifying glass to enlarge the screen of the mobile phone.

However, when looking at the mobile phone through the magnifying glass, the user needs to be very close to the magnifying glass to see the screen clearly, which can easily cause the head to lean forward, resulting in shoulder and neck soreness, and even cervical degeneration.

SUMMARY OF THE INVENTION

Therefore, the purpose of the present disclosure is to provide a high viewing angle magnifying device that can maintain an appropriate viewing distance.

The high viewing angle magnifying device of the present disclosure is suitable to be placed or clamped on a desk, and is used to obtain a magnified image of an object from a distance. The high viewing angle magnifying device comprises a bracket assembly and a mirror frame assembly.

The bracket assembly is suitable to be placed or clamped on the desktop. The mirror frame assembly is mounted above the bracket assembly in an up-and-down direction and forms an optical path for obtaining the magnified image from a distance. The mirror frame assembly comprises a reflective mirror frame, a rotation shaft, and a magnifying mirror frame. The reflective mirror frame is mounted on the bracket assembly and has a reflective mirror that is elevated above the desktop and inclined relative to the desktop. The rotation shaft is located at the top of the reflective mirror frame and extends along a horizontal direction perpendicular to the up-and-down direction. One end of the magnifying mirror frame is attached to the rotation shaft and is rotatable relative to the reflective mirror frame. The magnifying mirror frame has a magnifying mirror that is located above the object in the up-and-down direction, and the magnifying mirror is used to magnify the image. The optical path is configured to direct the light projecting from the object to the magnifying mirror, then the light reflected from the magnifying mirror and projects to the reflective mirror, and is finally reflected out by the reflective mirror.

The advantages of the present disclosure are as follows: The user can place the device directly on the desktop or clamp the device to the edge of the desktop, open the magnifying mirror frame, and then place the object under the magnifying mirror frame. The user's line of sight can look directly at the reflective mirror frame and see the magnified image in the reflective mirror. Since the magnified image is a proportional magnification of the object and is located at a distance (i.e., the reflective mirror), the user can clearly see the magnified image from a distance of 30 cm to 50 cm. Therefore, the user can use the device while maintaining an appropriate viewing distance.

BRIEF DESCRIPTION OF THE DRAWINGS

Other features and advantages of the present disclosure will be clearly presented with reference to the embodiments illustrated in the drawings, wherein.

DETAILED DESCRIPTION OF THE PREFERRED EMBODIMENTS

Figure 1:
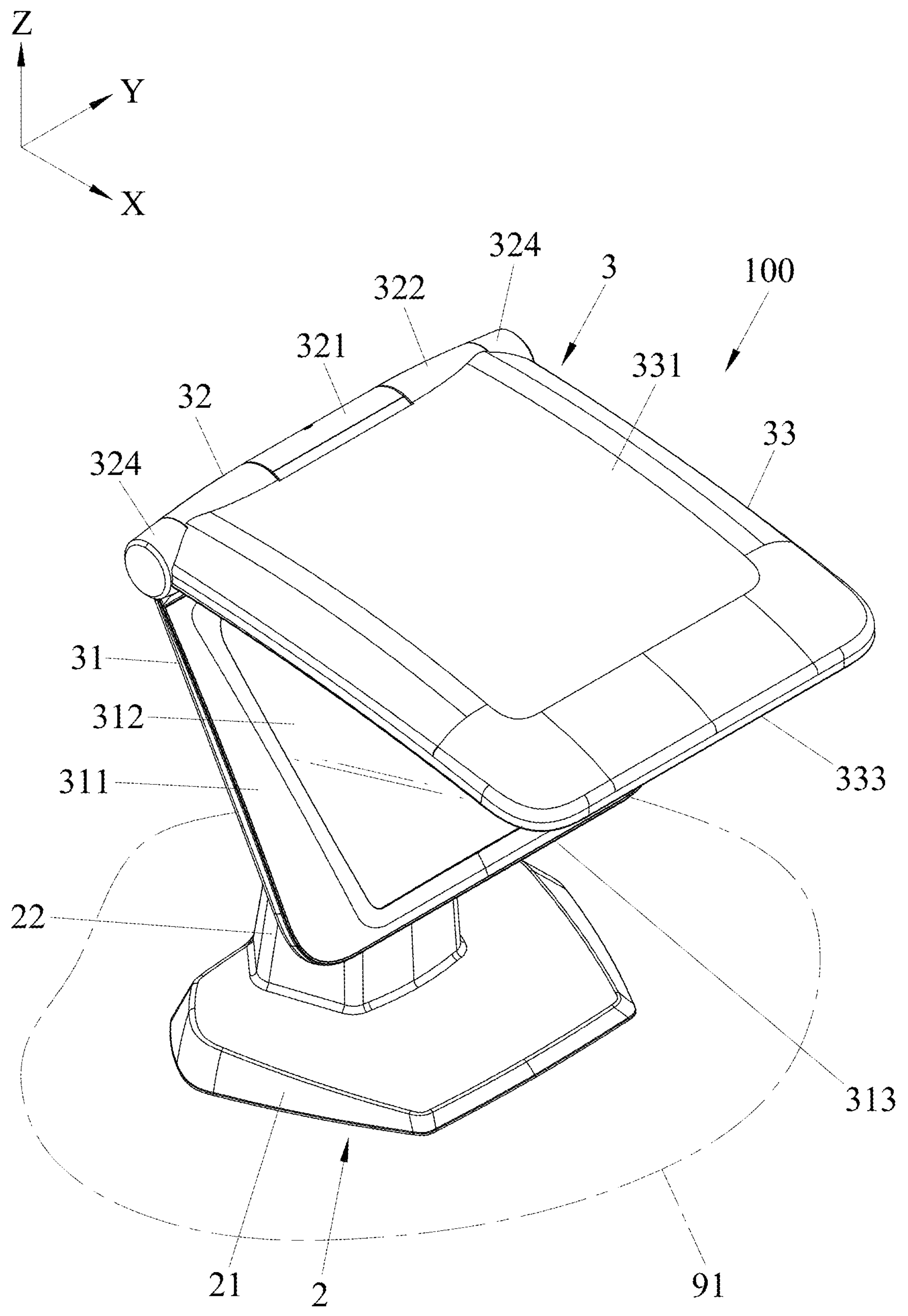
FIG. 1 is a perspective schematic view illustrating an embodiment of the high viewing angle magnifying device of the present disclosure placed on a desktop, with the magnifying mirror frame of the embodiment in an open state relative to the reflective mirror frame.
Figure 2:
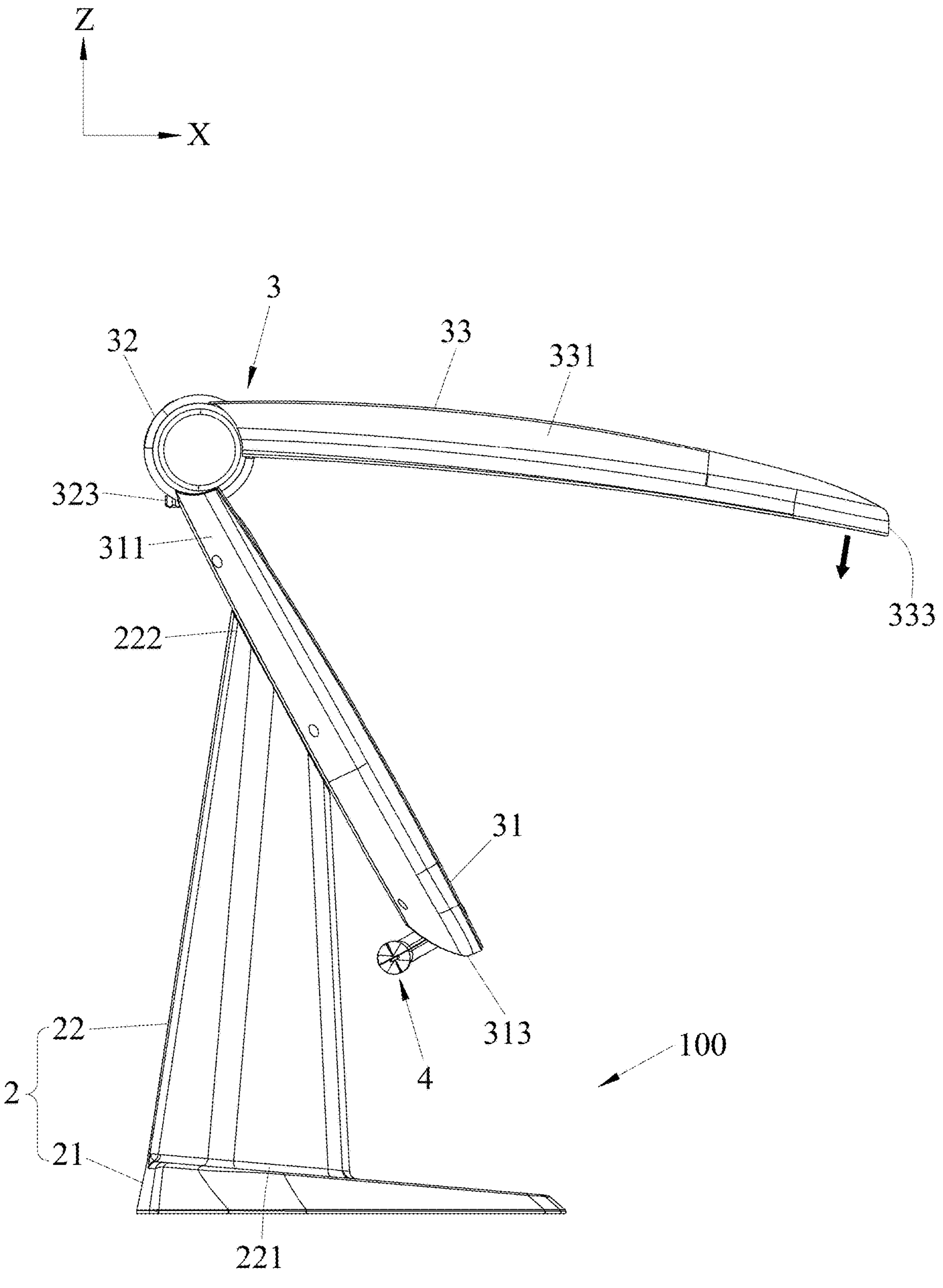
FIG. 2 is a side view of the embodiment with the magnifying mirror frame in an open state relative to the reflective mirror frame.
Figure 3:
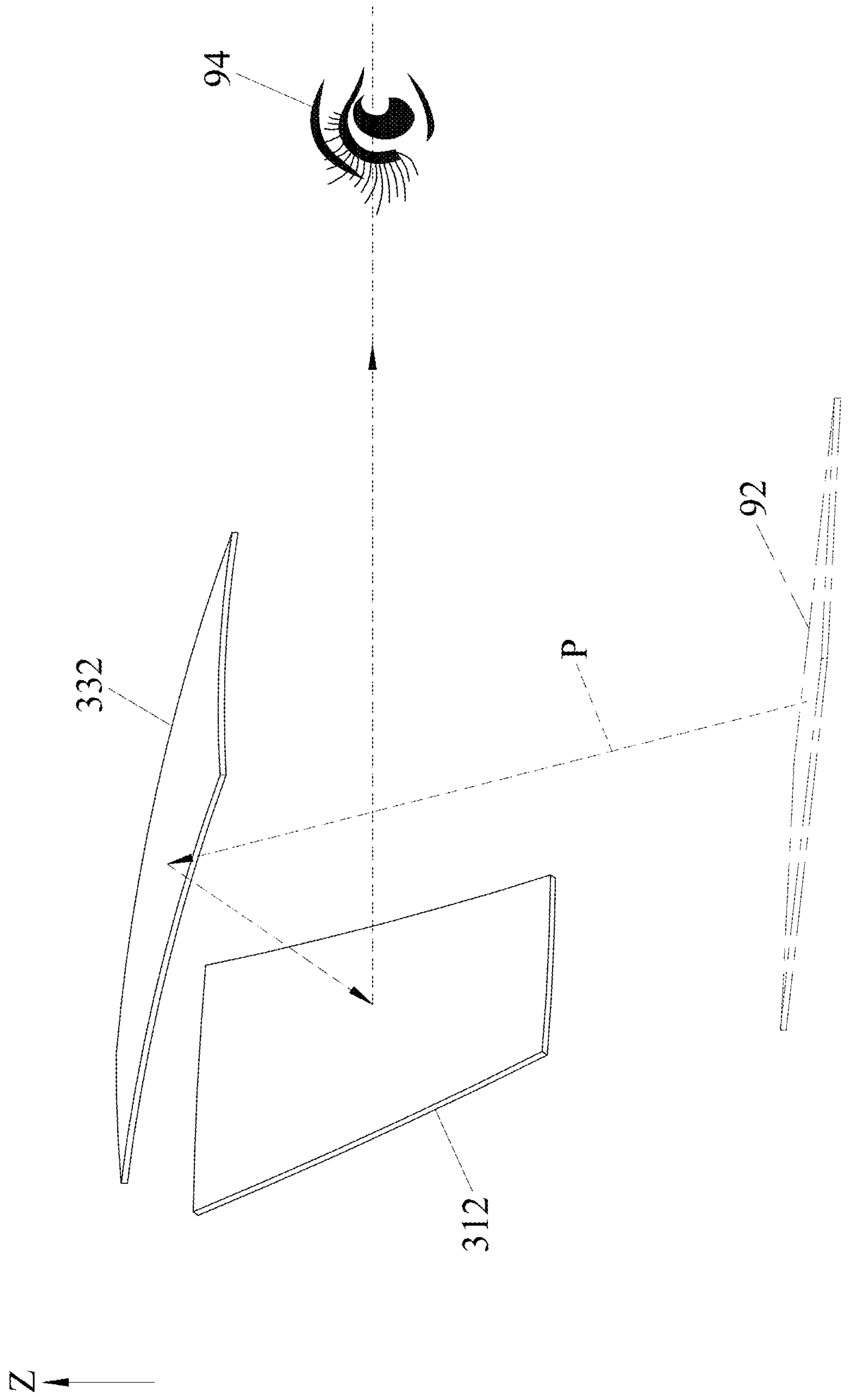
FIG. 3 is a schematic view of a user viewing an object through the optical path of the embodiment.

Referring to FIGS. 1 to 3, an embodiment of the high viewing angle magnifying device 100 according to the present disclosure is a desktop device suitable to be placed on a desktop 91 or clamped to the edge of the desktop 91, and is used to obtain a magnified image 93 (see FIG. 5) of an object 92 from a distance for viewing by a user 94. In this embodiment, the distance is defined as a remote distance from the user 94 to the object 92. The high viewing angle magnifying device 100 comprises a bracket assembly 2, a mirror frame assembly 3, and a light source 4. In use, the high viewing angle magnifying device 100 is placed in front of the line of sight of the user 94.

The bracket assembly 2 is suitable for being placed on the desktop 91, or for being clamped to the edge of the desktop 91. The bracket assembly 2 in this embodiment includes a base 21 placed on the desktop 91, and a support rod 22 extending upwardly from the base 21 along an up-and-down direction Z. The base 21 extends along a front-to-back direction X perpendicular to the up-and-down direction Z. The support rod 22 has a lower end 221 fixed to the base 21 and an upper end 222 opposite to the lower end 221. The upper surface of the upper end 222 is an inclined surface in this embodiment.

The mirror frame assembly 3 is mounted above the support rod 22 of the bracket assembly 2 in the up-and-down direction Z, and is used to form an optical path P for obtaining the magnified image 93 from a distance. In some embodiments, the support rod 22 can be designed as an extendable rod body, thereby adjusting the height of the mirror frame assembly 3. The mirror frame assembly 3 includes an reflective mirror frame 31, a rotation shaft 32, and an magnifying mirror frame 33.

The reflective mirror frame 31 is mounted on the upper end 222 of the support rod 22 in the up-and-down direction Z and has a lower casing 311 mounted on the upper end 222; and a reflective mirror 312, which is elevated above the desktop 91, is fixed to the lower casing 311 and faces the user 94. The lower casing 311 has a lower edge 313 adjacent to the base 21, and the reflective mirror 312 is inclined relative to the up-and-down direction Z, with the lower end of the reflective mirror 312 being oriented closer toward the user 94 than the upper end. The reflective mirror 312 is at a distance as mentioned above.

Figure 4:
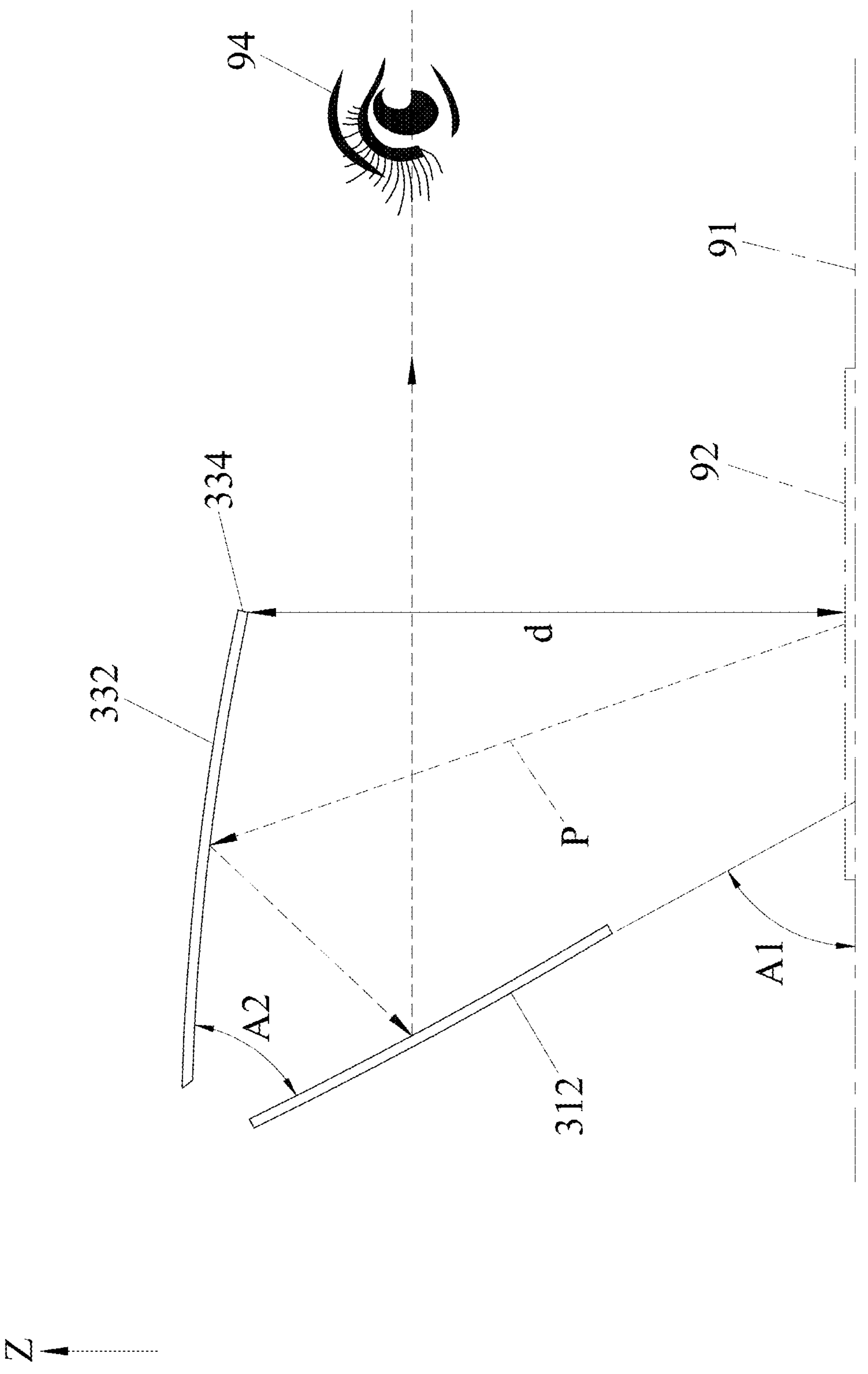
FIG. 4 is another schematic view of the optical path.

Referring to FIGS. 3 and 4, the reflective mirror 312 is inclined at an angle A1 relative to the desktop 91. When the angle A1 is between 30 degrees and 80 degrees, the center of the reflective mirror 312 can be approximately aligned with the line of sight of the user 94, allowing the user 94 to directly view the reflective mirror 312 without having to raise or lower the head, which is more in accordance with ergonomics. The reflective mirror 312 in this embodiment is a free-form concave mirror with an image magnification function. However, in other embodiments, the reflective mirror 312 may also be a spherical concave mirror or may not require the image magnification function, such that the reflective mirror 312 may also be a flat mirror. In addition, the contour of the reflective mirror 312 is roughly formed by four boundaries, with an upper boundary 321*a* being longer than a lower boundary 321*b*. In a particular embodiment, the reflective mirror 312 has a trapezoidal shape with a wider top and a narrower bottom, which can avoid the user 94 seeing the ceiling through the reflective mirror 312 and experiencing glare, but this is not a limitation.

Referring to FIGS. 1 to 3, the rotation shaft 32 is located at the top of the reflective mirror frame 31, and the rotation shaft 32 extends along a horizontal direction Y (i.e., left-to-right direction) perpendicular to the up-and-down direction Z and the front-to-back direction X.

One end of the magnifying mirror frame 33 is attached to the rotation shaft 32 and is rotatable relative to the reflective mirror frame 31. The magnifying mirror frame 33 has an upper casing 331 connected to the rotation shaft 32, and a magnifying mirror 332 fixed to the upper casing 331 for magnifying the image. The upper casing 331 has a side edge 333 away from the rotation shaft 32. The magnifying mirror 332 is located above the object 92 in the up-and-down direction Z. The magnifying mirror 332 in this embodiment is a free-form concave mirror, and its area is larger than that of the reflective mirror 312. However, in other embodiments, the magnifying mirror 332 may also be other forms of concave mirrors that also have the function of magnifying the image.

Figure 5:
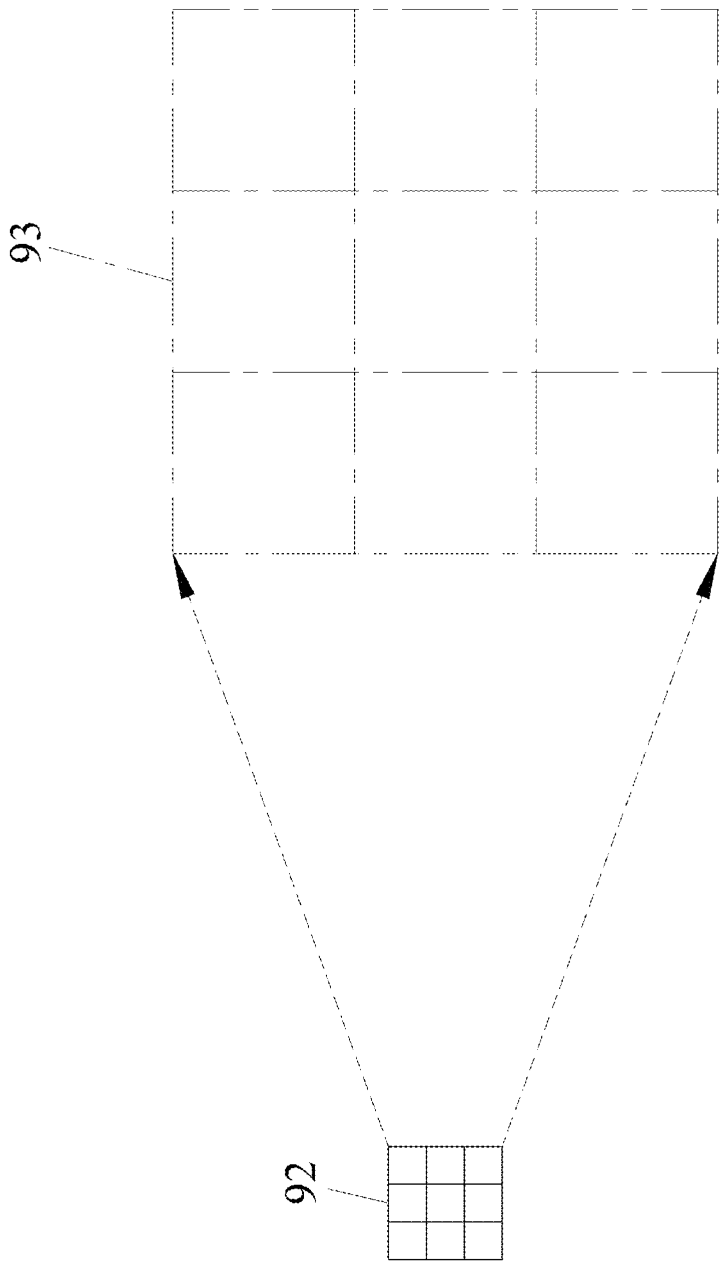
FIG. 5 is a schematic view illustrating the magnified image of the object after passing through the optical path.

Referring to FIGS. 4 and 5, the optical path P of the present disclosure is configured to direct the light projecting from the object 92 to the magnifying mirror 332, then the light reflected from the magnifying mirror 332 and projects to the reflective mirror 312, and is finally reflected out the magnified image 93 from the reflective mirror 312. Thus, the user 94 can directly look at the reflective mirror 312 (i.e., at a distance) while maintaining an appropriate viewing distance and clearly see the magnified image 93.

Additionally, with respect to the optical path P, the magnifying mirror 332 is designed not to receive direct light from the lower casing 311. In other words, the light from the lower casing 311 itself will not enter the receiving area of the magnifying mirror 332 in the optical path P. The term "entirely or partially not receive" means that even if a portion of the lower casing 311 is located below the magnifying mirror 332, when the viewing eye 94 directly looks at the reflective mirror 312 and observes the object 92 actually located below the magnifying mirror 332, based on the composition of the combined optical path, the magnifying mirror 332 will not receive the light path directly projected from the lower casing 311 toward the magnifying mirror 332. Alternatively, it is means that the magnifying mirror 332 may receive a small portion of the image from the lower casing 311, but the vast majority of the magnified image 93 comes from the object 92.

The magnifying mirror 332 in one embodiment causes a downward curvature effect on the image, while the reflective mirror 312 causes an upward curvature effect on the image. Therefore, the two free-form concave mirrors of the magnifying mirror 332 and the reflective mirror 312 can mutually offset the image distortion, resulting in the magnified image 93 that is proportional to and free of distortion compared to the object 92.

The reflective mirror 312 and the magnifying mirror 332 are at an angle A2, wherein the angle A2 is 49 degrees in this embodiment. However, as long as the angle A2 is between 40 and 60 degrees, a better imaging effect can be achieved.

Additionally, one side edge 334 of the magnifying mirror 332 is separated from the upper surface of the object 92 by a distance d in the up-and-down direction Z. The distance d in this embodiment is 50 cm. If the distance d is too large, the image will become blurred, and if the distance d is too small, it will obstruct the line of sight of the user 94. Therefore, the distance d between 40 and 60 cm is more appropriate.

Based on the value ranges of the angle A2 and the distance d, the free-form curvature parameters of the reflective mirror 312 and the magnifying mirror 332 can be calculated. The image of the object 92 is magnified through the optical path P and displayed on the reflective mirror 312 (i.e., at a distance) so that the user 94 can comfortably read the contents of the object 92 while maintaining an appropriate viewing distance of 30 cm to 50 cm. If the user 94 is too close to the device, the magnified image 93 will be excessively magnified, making it difficult for the user 94 to view. If the user 94 is too far from the device, the magnification ratio of the magnified image 93 will be rather small, making it hard to see clearly. Therefore, the user 94 can maintain an appropriate viewing distance while using the device, while also having a better viewing angle and reading comfort.

Figure 6:
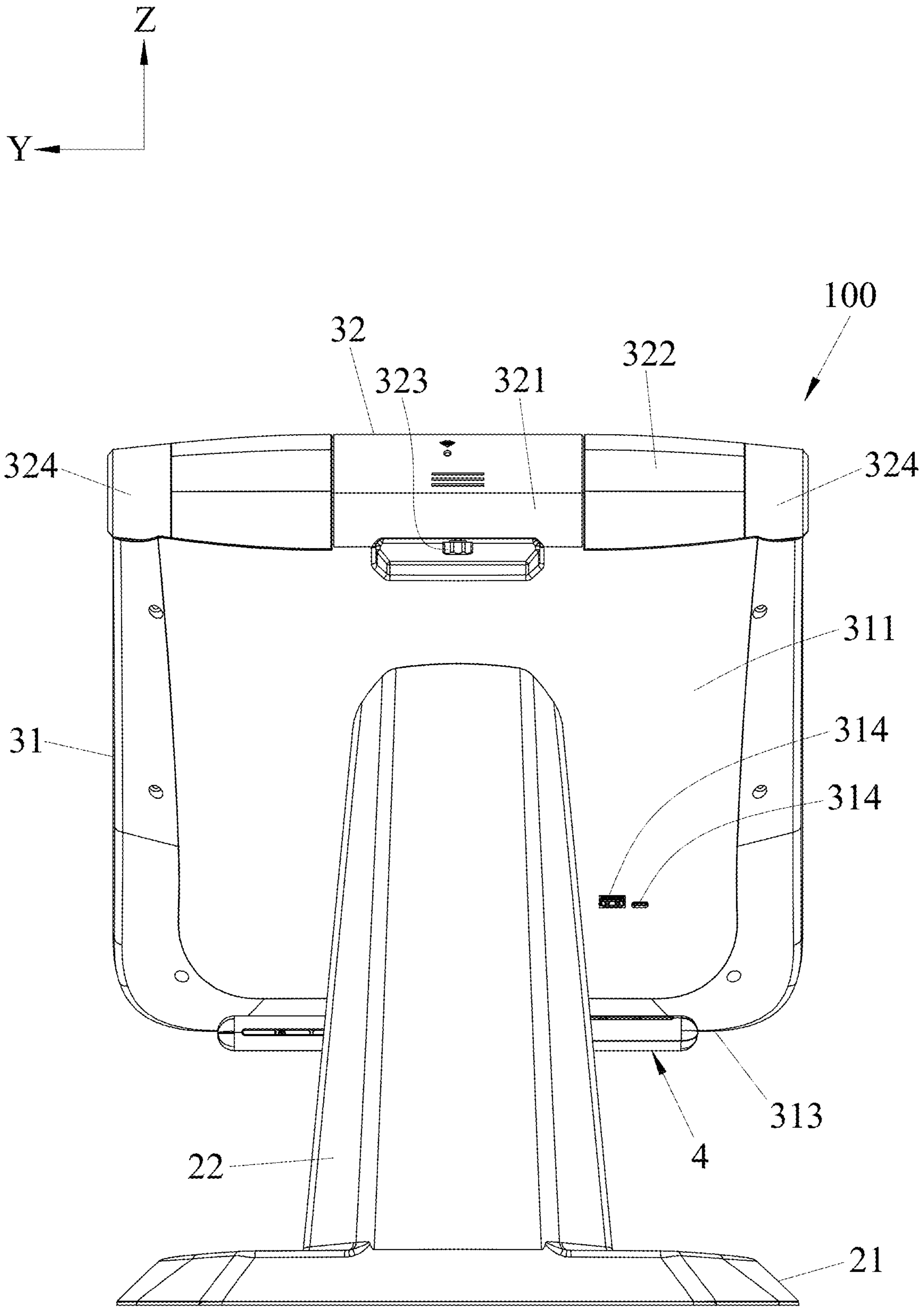
FIG. 6 is a rear view of the embodiment.

Referring to FIGS. 1, 2 and 6, the rotation shaft 32 includes a first pivot 321 formed on one side of the lower casing 311, a second pivot 322 formed on one side of the upper casing 331 and capable of rotating relative to the first pivot 321, and a knob 323. More specifically, the second pivot 322 is composed of two pivot plates spaced apart in the horizontal direction Y. The rotation shaft 32 also includes two caps 324 fixed to the outer ends of the respective pivot plates. By turning the knob 323, the angle A2 can be adjusted and fixed.

Figure 7:
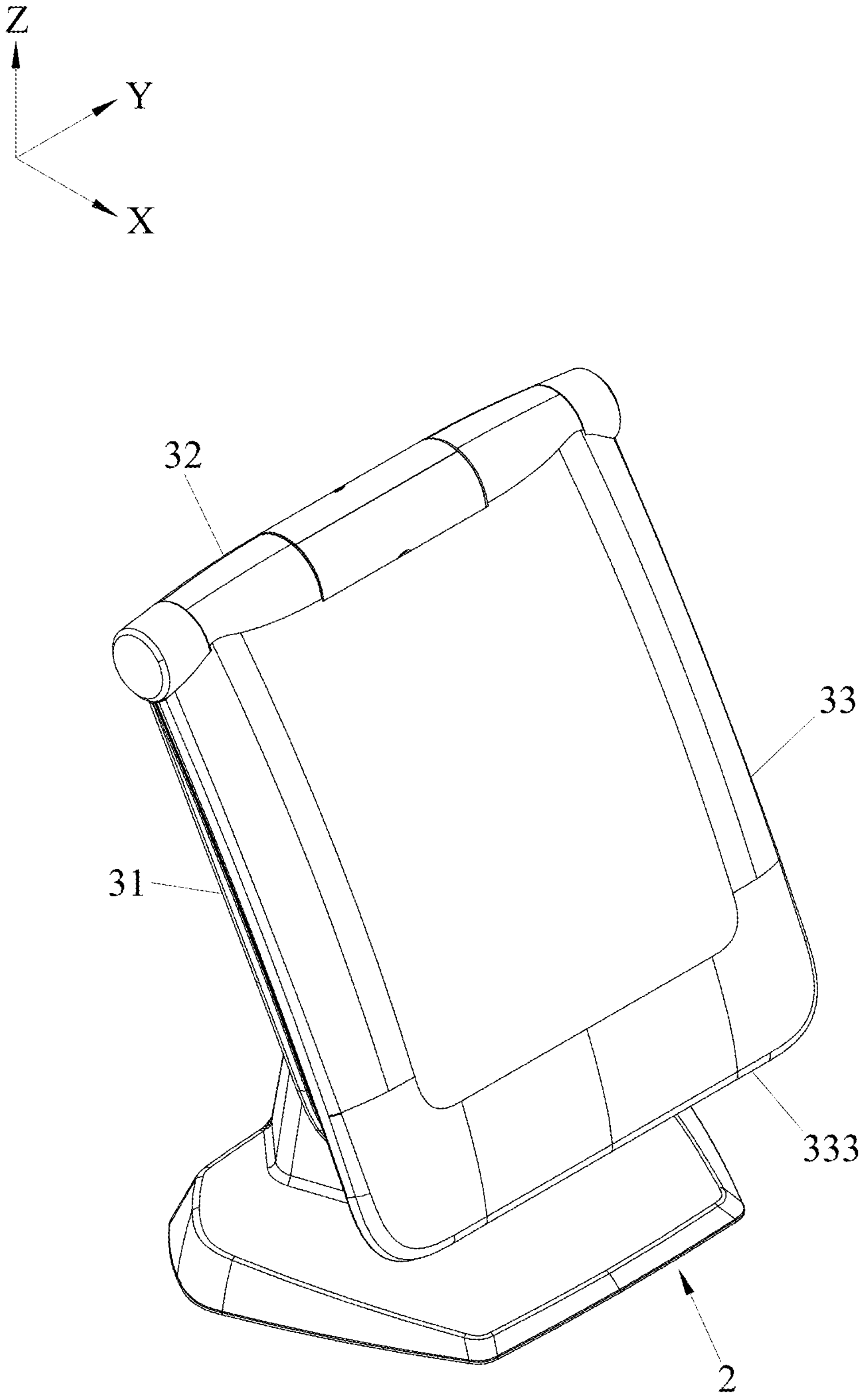
FIG. 7 is a perspective view similar to FIG. 1, but with the magnifying mirror frame in a closed state relative to the reflective mirror frame.

Referring to FIGS. 1 and 7, the magnifying mirror frame 33 can be pivoted relative to the reflective mirror frame 31 between an open state (as shown in FIG. 1) and a closed state (as shown in FIG. 7).

Referring to FIGS. 1 and 2, when the magnifying mirror frame 33 is in the open state, the magnifying mirror frame 33 is opened to a nearly horizontal position, and the side edge 333 of the magnifying mirror frame 33 is slightly lower than the rotation shaft 32 and higher than the lower edge 313 of the reflective mirror frame 31.

Figure 8:
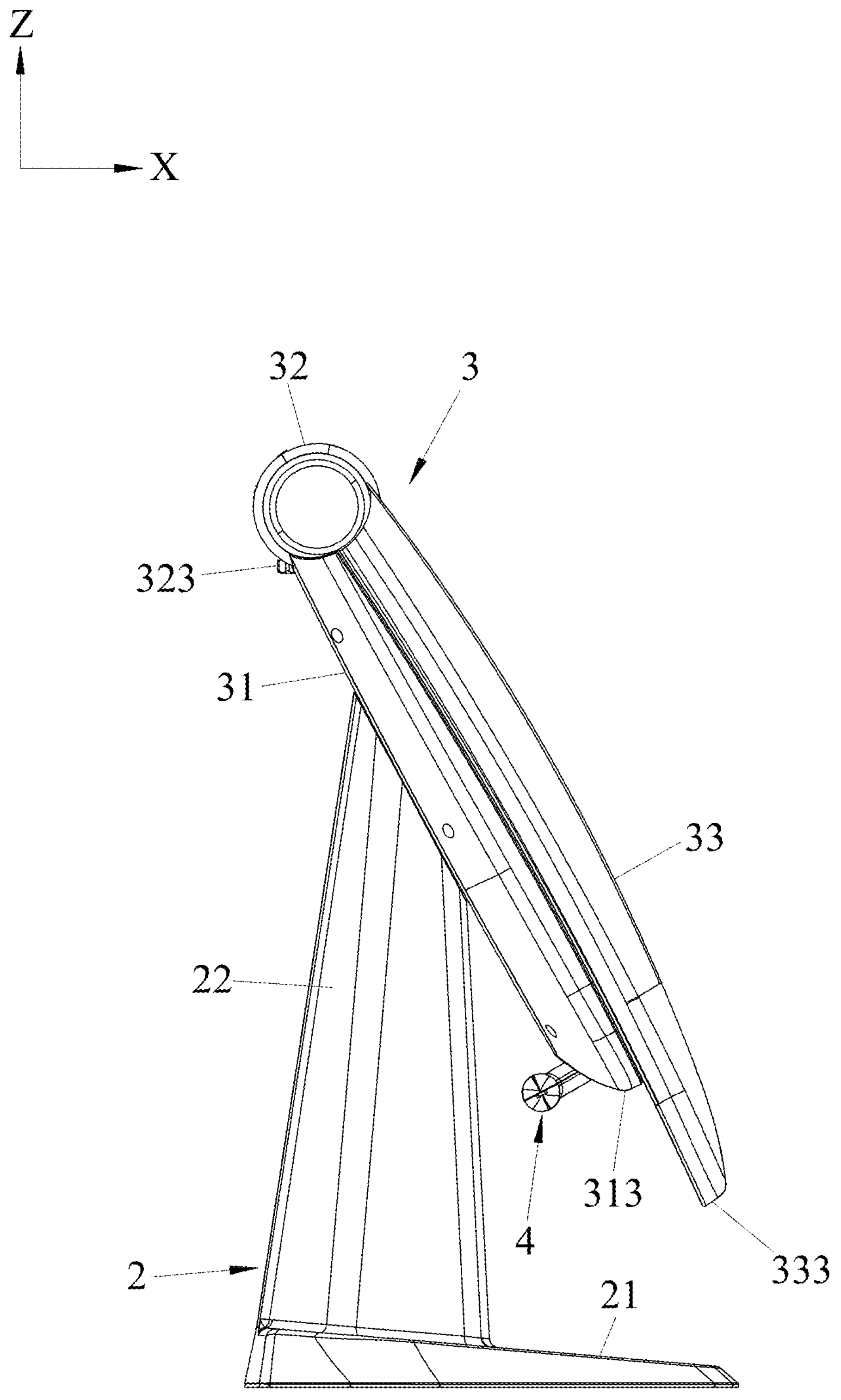
FIG. 8 is a side view similar to FIG. 2, but with the magnifying mirror frame in a closed state relative to the reflective mirror frame.

Referring to FIGS. 7 and 8, when the magnifying mirror frame 33 is in the closed state, the magnifying mirror frame 33 is folded onto the reflective mirror frame 31, and the side edge 333 of the magnifying mirror frame 33 is lower than the lower edge 313 of the reflective mirror frame 31. From FIG. 8, it can be seen that the length of the magnifying mirror frame 33 is greater than the length of the reflective mirror frame 31.

Referring to FIGS. 2, 4 and 6, the light source 4 is used to provide a fill light for the light entering into the optical path P. The light source 4 in this embodiment is an LED light and is installed at the lower edge 313 of the lower casing 311. However, in other embodiments, the light source 4 may also be a light source installed at other locations or may be replaced by existing home lighting fixtures, as long as it can provide sufficient light for the mirror frame assembly 3.

Figure 9:
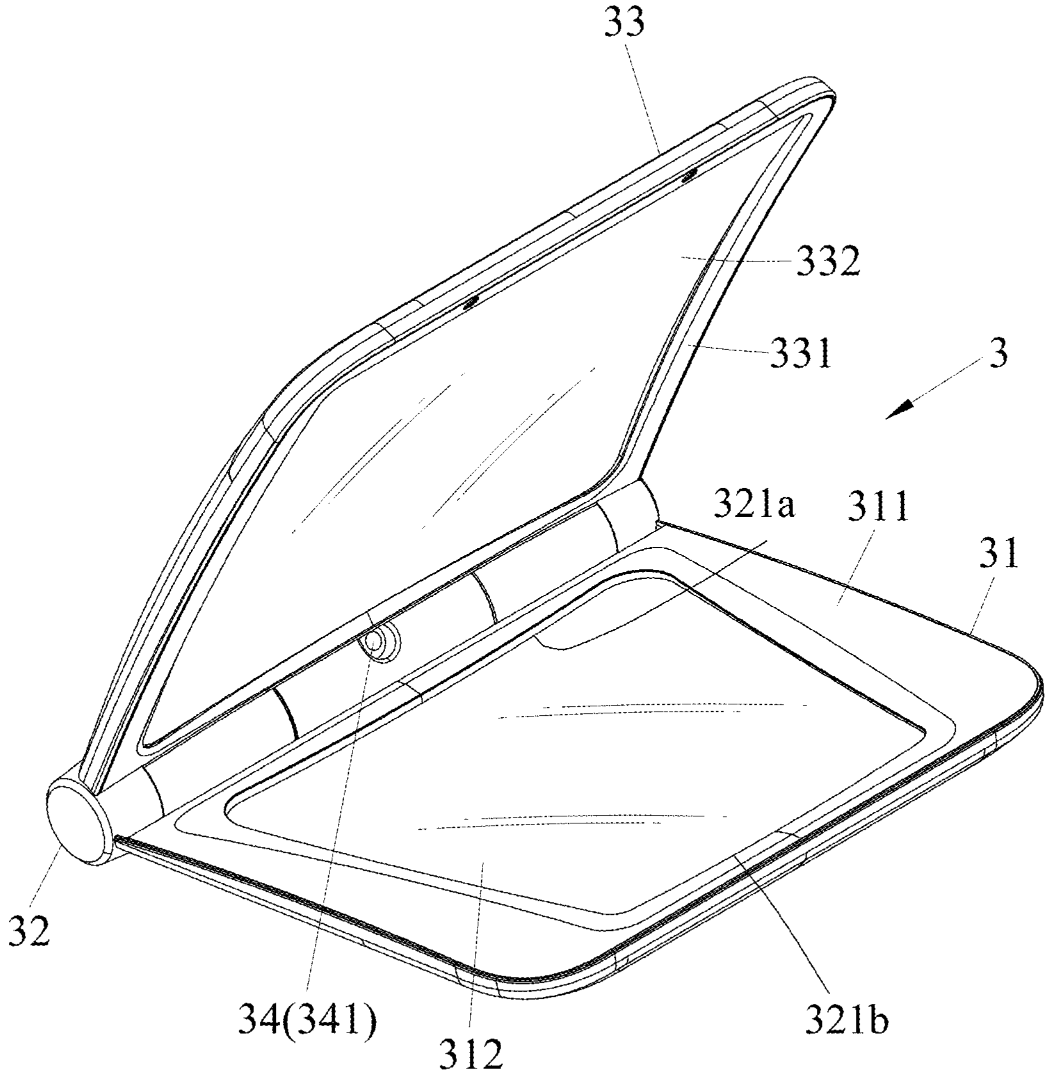
FIG. 9 is a perspective view of the mirror frame assembly of the embodiment.

Referring to FIG. 9, the mirror frame assembly 3 in this embodiment further includes an image capturing unit 34. The image capturing unit 34 is mounted on the rotation shaft 32 and is equipped with a lens 341 within the rotation shaft 32, and is capable of capturing images toward the user 94 (see FIG. 4). This allows monitoring or recording of the status of the user 94 during use. In some embodiments, the position of the image capturing unit 34 may be varied or omitted.

Referring to FIG. 6, the reflective mirror frame 31 in this embodiment also has two sockets 314 formed on the rear side of the lower casing 311. These sockets 314 are used for connecting external power cables to supply power to the image capturing unit 34 and the light source 4. In other embodiments, the high viewing angle magnifying device 100 of the present disclosure can also be powered by built-in batteries.

Figure 10:
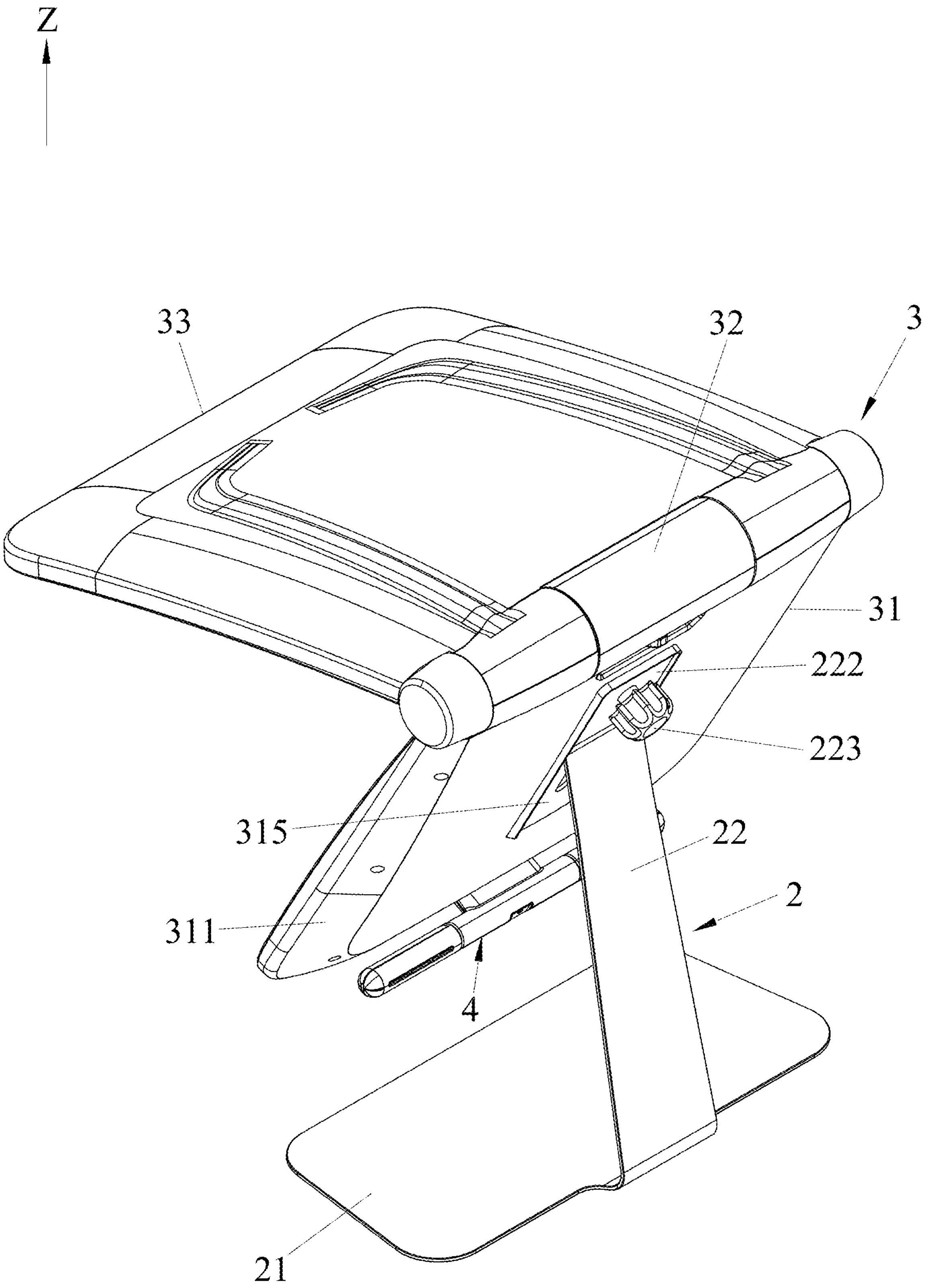
FIG. 10 is an illustration of a variation of the embodiment.

Referring to FIG. 10, which is a variation of the embodiment. The difference is:

The support rod 22 of the bracket assembly 2 is plate-shaped and extends upwardly and obliquely toward the user 94 (see FIG. 4) from the edge of the base 21, and the upper end 222 of the support rod 22 extends along the rear side of the lower casing 311 and is obliquely away from the user 94.

The base 21 includes a counterweight (not shown) therein to maintain a balance.

The reflective mirror frame 31 further includes a sliding groove 315 formed on the rear side of the lower casing 311.

The upper end 222 of the support rod 22 is slidably mounted on the reflective mirror frame 31, and the support rod 22 has an adjusting component 223 which can be rotatably screwed to the upper end 222 and the sliding groove 315. By unscrewing the adjusting component 223, the mirror frame assembly 3 can then be moved up and down relative to the bracket assembly 2 in the up-and-down direction Z to adjust the height of the mirror frame assembly 3. The adjusting component 223 may be a knob or other screwable or unscrewable component.

The high viewing angle magnifying device 100 of the present disclosure can be placed directly on the desktop 91, or the base 21 can be designed as a clamp to be clamped on the edge of the desktop 91 for use. The user 94 need only open the magnifying mirror frame 33 to the open state and place the object 92 under the magnifying mirror frame 33 with the line of sight horizontally looking at the reflective mirror frame 31, then the user 94 can see the magnified image 93 on the reflective mirror 312 (i.e., at a distance). The user 94 can use the device while maintaining the appropriate viewing distance of 30 cm to 50 cm, while also having a better viewing angle and reading comfort. In addition, since the magnifying mirror frame 33 is in a horizontal state, it can prevent the user 94 from getting too close to the device, thereby maintaining the appropriate viewing distance and effectively achieving the purpose of the present disclosure.

However, the above descriptions are merely embodiments of the present disclosure and should not be used to limit the scope of implementation of the present disclosure. Any simple equivalent variations and modifications made within the scope of the patent claims and the patent specification are still within the scope of the present disclosure.

LIST OF REFERENCE SIGNS

100: high viewing angle magnifying device
2: bracket assembly
21: base
22: support rod
221: lower end
222: upper end
223: adjusting component
3: mirror frame assembly
31: reflective mirror frame
311: lower casing
312: reflective mirror
313: lower edge
314: sockets
315: sliding groove
32: rotation shaft
321: first pivot
322: second pivot
323: knob
324: caps
33: magnifying mirror frame
331: upper shell
332: magnifying mirror
333: side edge
334: side edge
34: image capturing unit
341: lens
4: light source
91: desktop
92: object
93: magnified image
94: user
A1: angle
A2: angle
d: distance
P: optical path
X: front-to-back direction
Y: horizontal direction
Z: up-and-down direction

What is claimed is:

1. A high viewing angle magnifying device suitable for being placed or clamped on a desktop and used to obtain a magnified image of an object from a distance, said high viewing angle magnifying device comprising:

a bracket assembly, adapted to be placed or clamped on said desktop; and a mirror frame assembly, mounted in an up-and-down direction above said bracket assembly and forming an optical path for obtaining said magnified image from said distance, said mirror frame assembly including:

a reflective mirror frame, mounted on said bracket assembly, having a reflective mirror elevated above said desktop and inclined relative to said desktop, a rotation shaft, located at the top of said reflective mirror frame, said rotation shaft extending along a horizontal direction perpendicular to said up-and-down direction, and a magnifying mirror frame, one end of which is attached to said rotation shaft and rotates relative to said reflective mirror frame, said magnifying mirror frame having a magnifying mirror located above said object in said up-and-down direction, said magnifying mirror being used to magnify the image, wherein said optical path is configured to direct a light projecting from said object to said magnifying mirror, then said light of said object reflected from said magnifying mirror and projects to said reflective mirror, and is finally reflected out by said reflective mirror.

2. The high viewing angle magnifying device according to claim 1, further comprising a light source, said light source providing light projects said optical path.

3. The high viewing angle magnifying device according to claim 2, wherein said reflective mirror frame further comprises a lower casing for mounting said reflective mirror, and said light source is installed on a lower edge of said lower casing.

4. The high viewing angle magnifying device according to claim 1, wherein said reflective mirror frame further comprises a lower casing for mounting said reflective mirror, and said magnifying mirror frame further comprises an upper casing for mounting said magnifying mirror, said rotation shaft including a first pivot formed on one side of said lower casing and a second pivot formed on one side of said upper casing which rotates relative to said first pivot.

5. The high viewing angle magnifying device according to claim 1, wherein said reflective mirror frame further comprises a lower casing for mounting said reflective mirror, and said magnifying mirror is designed entirely not to receive or partially not to receive direct light from said lower casing.

6. The high viewing angle magnifying device according to claim 1, wherein said mirror frame assembly further comprises an image capturing unit, said image capturing unit having a lens.

7. The high viewing angle magnifying device according to claim 1, wherein said magnifying mirror frame further comprises a side edge away from and lower than said rotation shaft, and said magnifying mirror frame is pivotable relative to said reflective mirror frame between an open state and a closed state, in which open state said side edge of the said magnifying mirror frame is lower than said rotation shaft and higher than a lower edge of said reflective mirror frame, while in which closed state said magnifying mirror frame is folded onto said reflective mirror frame and said side edge of said magnifying mirror frame is lower than said lower edge of said reflective mirror frame.

8. The high viewing angle magnifying device according to claim 1, wherein said magnifying mirror or said reflective mirror is a free-form concave mirror.

9. The high viewing angle magnifying device according to claim 1, wherein an area of said reflective mirror is smaller than an area of said magnifying mirror.

10. The high viewing angle magnifying device according to claim 1, wherein an upper boundary of said reflective mirror is longer than a lower boundary thereof.

11. The high viewing angle magnifying device according to claim 1, wherein said bracket assembly comprises a base for being placed on said desktop and a support rod extending upwardly from said base along said up-and-down direction, said support rod having a lower end fixed to said base and an upper end opposite to said lower end for mounting said reflective mirror frame.

12. The high viewing angle magnifying device according to claim 1, wherein said reflective mirror and said magnifying mirror are at an angle between 40 and 60 degrees.

13. The high viewing angle magnifying device according to claim 1, wherein one side edge of said magnifying mirror is separated from an upper surface of said object by a distance in said up-and-down direction, said distance being between 40 and 60 cm.

14. The high viewing angle magnifying device according to claim 1, wherein said bracket assembly comprises an adjusting component adjustably mounted on said reflective mirror frame, and said mirror frame assembly is movable up and down relative to said bracket assembly in said up-and-down direction.

* * * * *